(12) United States Patent
Ko

(10) Patent No.: US 11,699,218 B2
(45) Date of Patent: *Jul. 11, 2023

(54) METHOD CONTROLLING IMAGE SENSOR PARAMETERS

(71) Applicant: SAMSUNG ELECTRONICS CO., LTD., Suwon-si (KR)

(72) Inventor: Ha Young Ko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,118

(22) Filed: Nov. 22, 2021

(65) Prior Publication Data

US 2022/0086382 A1 Mar. 17, 2022

Related U.S. Application Data

(63) Continuation of application No. 17/099,686, filed on Nov. 16, 2020, now Pat. No. 11,184,570, which is a (Continued)

(30) Foreign Application Priority Data

Sep. 25, 2015 (KR) .......................... 10-2015-0136450

(51) Int. Cl.
*G06T 5/00* (2006.01)
*G06T 5/50* (2006.01)
(Continued)

(52) U.S. Cl.
CPC .............. *G06T 5/007* (2013.01); *G06F 18/22* (2023.01); *G06T 5/50* (2013.01); *G06V 10/141* (2022.01);
(Continued)

(58) Field of Classification Search
CPC .. H04N 5/3765; H04N 5/2258; H04N 5/2351; H04N 5/2352; H04N 5/357;
(Continued)

(56) References Cited

U.S. PATENT DOCUMENTS 6,381,360 B1 4/2002 Sogawa
7,676,146 B2 3/2010 Border et al.
(Continued)

FOREIGN PATENT DOCUMENTS

JP 2005092822 4/2005
JP 2007323587 12/2007
(Continued)

OTHER PUBLICATIONS

Taiwanese Examination Report dated Mar. 20, 2022, Cited in Taiwanese Patent Application.

*Primary Examiner* — Twyler L Haskins
*Assistant Examiner* — Angel L Garces-Rivera
(74) *Attorney, Agent, or Firm* — Volentine, Whitt & Francos, PLLC

(57) ABSTRACT

A method of controlling parameters for image sensors includes; receiving a first image and a second image, calculating first feature values related to the first image and second feature values related to the second image; generating comparison results by comparing the first feature values of fixed regions and first variable regions of the first image with the second feature values of fixed regions and first variable regions of the second image, and controlling at least one parameter on the basis of the comparison results.

17 Claims, 11 Drawing Sheets

Related U.S. Application Data continuation of application No. 16/449,287, filed on Jun. 21, 2019, now Pat. No. 10,868,993, which is a continuation of application No. 15/273,049, filed on Sep. 22, 2016, now Pat. No. 10,375,337.

(51) Int. Cl.

| | | |
|---|---|---|
| *H04N 13/133* | (2018.01) | |
| *G06V 10/141* | (2022.01) | |
| *G06F 18/22* | (2023.01) | |
| *H04N 25/71* | (2023.01) | |
| *H04N 23/45* | (2023.01) | |
| *H04N 23/71* | (2023.01) | |
| *H04N 23/72* | (2023.01) | |
| *H04N 25/60* | (2023.01) | |

(52) U.S. Cl.
CPC .......... *H04N 13/133* (2018.05); *H04N 23/45* (2023.01); *H04N 23/71* (2023.01); *H04N 23/72* (2023.01); *H04N 25/60* (2023.01); *H04N 25/745* (2023.01); *G06T 2207/20021* (2013.01)

(58) Field of Classification Search
CPC .... H04N 13/133; G06K 9/6201; G06T 5/007; G06T 5/50; G06T 2207/20021; G06V 10/141; G06V 10/60; G06V 10/467
See application file for complete search history.

(56) References Cited

U.S. PATENT DOCUMENTS

| | | | |
|---|---|---|---|
| 7,956,886 | B2 | 6/2011 | Murayama |
| 10,455,168 | B2 | 10/2019 | Mcmahon |
| 10,868,993 | B2 * | 12/2020 | Ko ........................ H04N 25/60 |
| 11,184,570 | B2 * | 11/2021 | Ko ........................ G06K 9/6201 |
| 2010/0128108 | A1 | 5/2010 | Song et al. |
| 2012/0062694 | A1 | 3/2012 | Muramatsu |
| 2014/0341467 | A1 | 11/2014 | Seo |
| 2016/0269627 | A1 | 9/2016 | Mcmahon |

FOREIGN PATENT DOCUMENTS

| | | |
|---|---|---|
| JP | 2009088726 | 4/2009 |
| JP | 2010016803 | 1/2010 |
| JP | 2010521005 A | 6/2010 |
| JP | 5110926 B2 | 12/2012 |
| JP | 2014072797 A | 4/2014 |
| KR | 0770019 | 10/2007 |
| KR | 20110104698 A | 9/2011 |
| KR | 1245247 B1 | 3/2013 |
| KR | 20130136372 A | 12/2013 |
| KR | 20140134374 A | 11/2014 |

\* cited by examiner

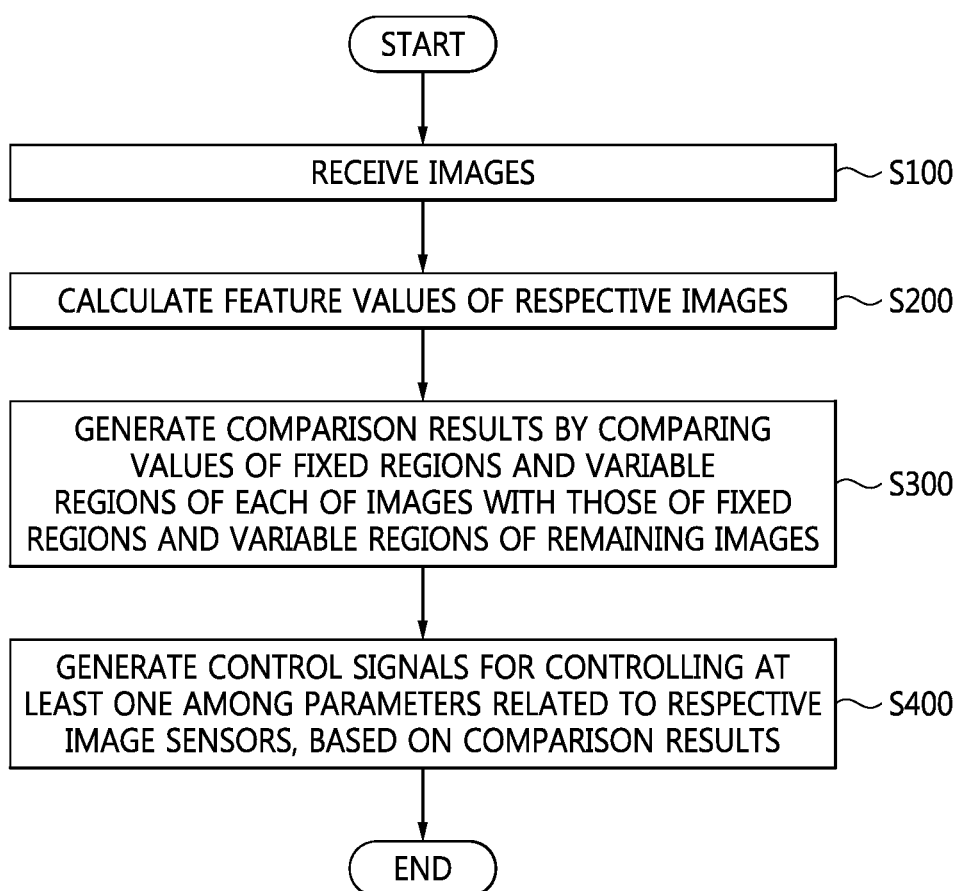

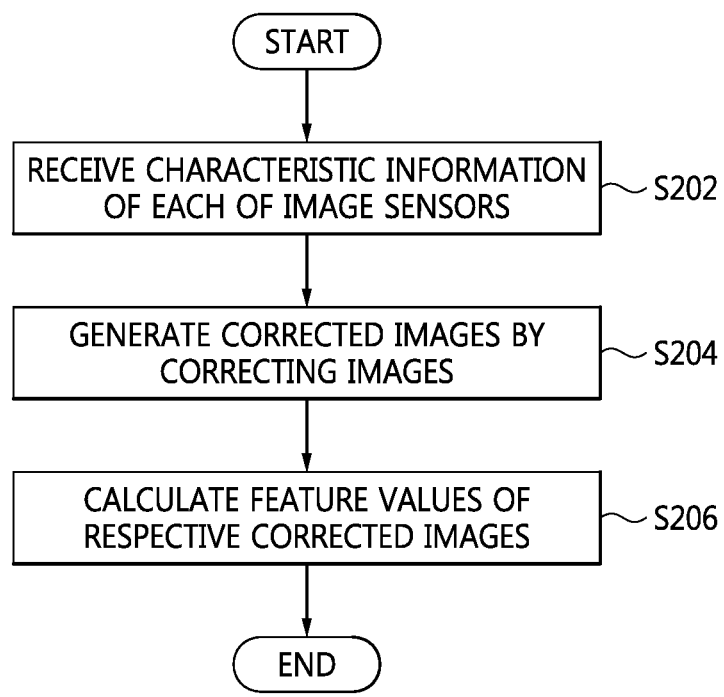

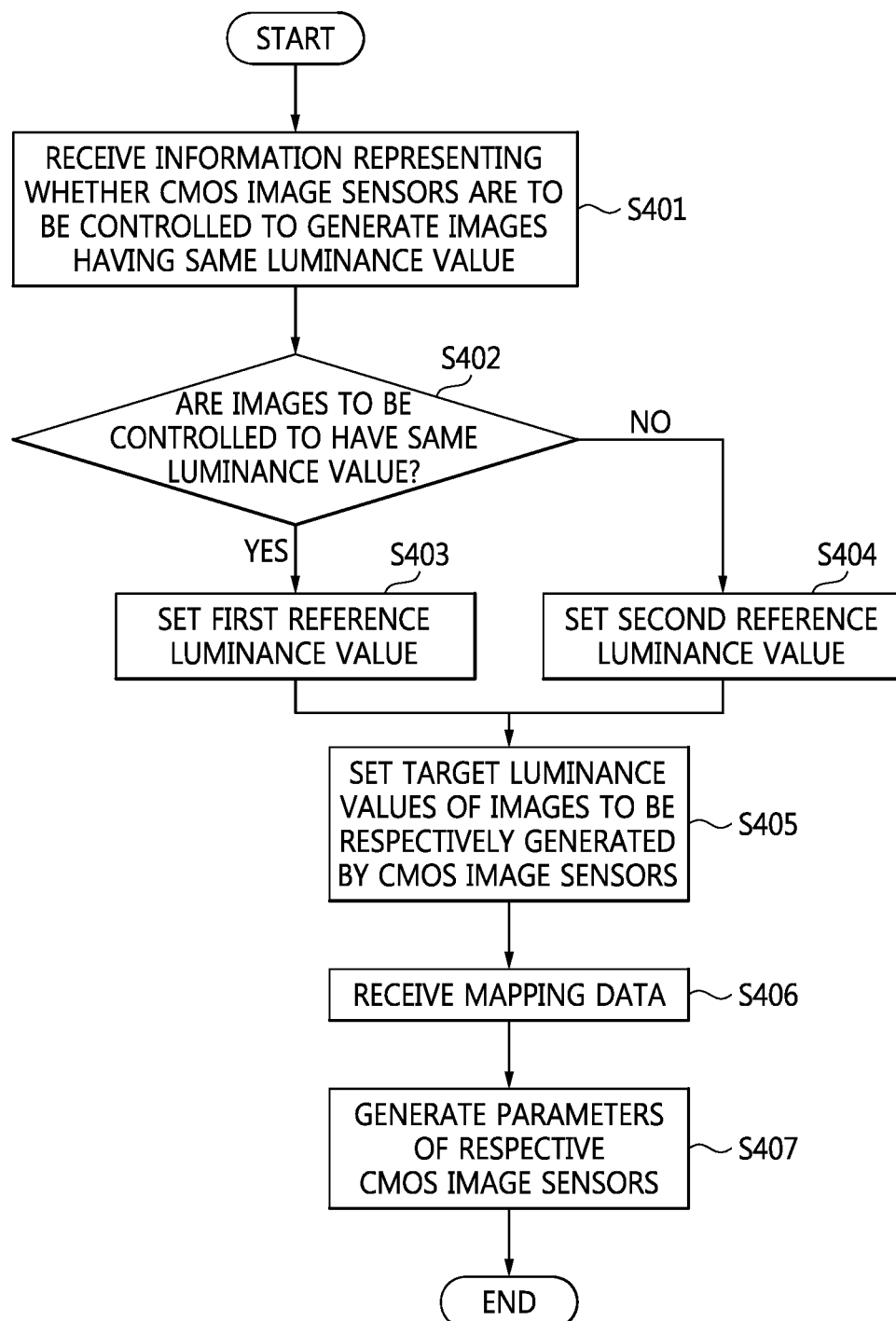

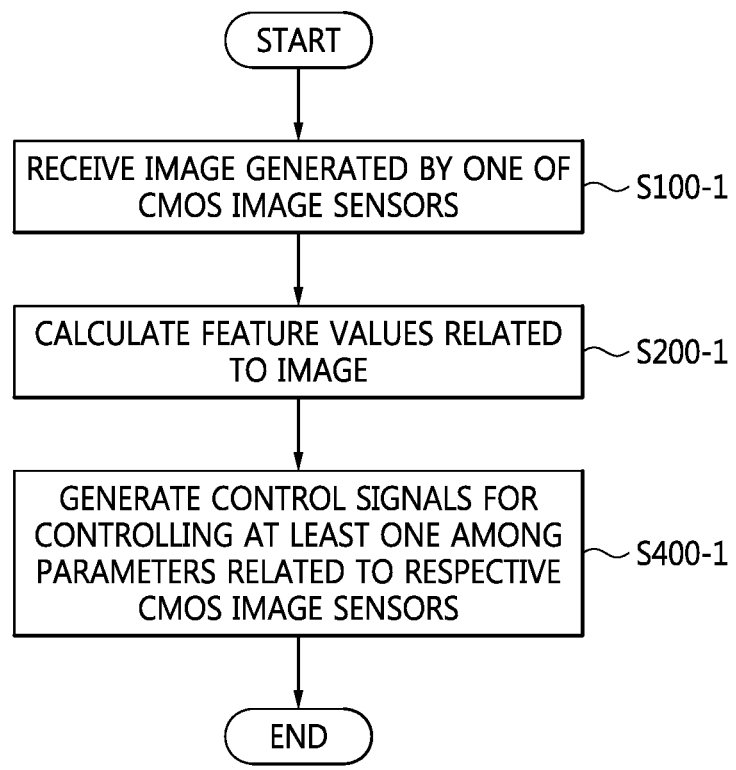

METHOD CONTROLLING IMAGE SENSOR PARAMETERS

CROSS-REFERENCE TO RELATED APPLICATION

This is a Continuation of U.S. application Ser. No. 17/099,686, filed Nov. 16, 2020, which issued as U.S. Pat. No. 11,184,570 on Nov. 23, 2021, which is a Continuation of U.S. application Ser. No. 16/449,287, filed Jun. 21, 2019, which issued as U.S. Pat. No. 10,868,993 on Dec. 15, 2022, which is a Continuation of U.S. application Ser. No. 15/273,049, filed Sep. 22, 2016, which issued as U.S. Pat. No. 10,375,337, on Aug. 6, 2019, and which claims the benefit of Korean Patent Application No. 10-2015-0136450 filed on Sep. 25, 2015, the subject matter of which is hereby incorporated by reference.

BACKGROUND

The inventive concept relates generally to methods of controlling image sensor parameter(s). More particularly, the inventive concept relates to methods of controlling parameters associated with a plurality of image sensors using images obtained by the plurality of image sensors. In certain embodiments of the inventive concept, images obtained by the parameter-controlled plurality of sensors may have preset luminance value(s).

As the ongoing digital convergence of different information and/or communication technologies into respective user devices continues, it is understood that many of the technologies include one or more image sensors. This is true for many contemporary multimedia devices, portable electronic devices and the like that use digital video signal processing.

Various types of images (e.g., a high dynamic range (HDR) image, a stereo image, a panorama image, etc.), may be provided by processing image data obtained from one or more image sensors. A combination of images using various application program(s) in a multimedia device or the like may be used for a variety of purposes.

In order to obtain such images, a plurality of image sensors may be controlled such that the resulting images obtained by the plurality of image sensors have either the same luminance value or different luminance values. Accordingly, when the plurality of image sensors are controlled to obtain images having the same luminance value, the images should exhibit a high degree of luminance similarity. In contrast, when the plurality of image sensors are controlled to obtain images having different luminance values, the images may be respectively exposure-bracketed.

SUMMARY

According to an aspect of the inventive concept, a method of controlling parameters of a plurality of image sensors includes: receiving a first image and a second image, the first image being generated by a first image sensor operated on the basis of first parameters and the second image being generated by a second image sensor operated on the basis of second parameters; calculating first feature values related to the first image and second feature values related to the second image; generating first comparison results by comparing the first feature values of fixed regions and first variable regions of the first image with the second feature values of fixed regions and first variable regions of the second image; and controlling at least one among the first parameters and the second parameters on the basis of the first comparison results.

In one embodiment, the method may further include calculating third feature values related to the first image and fourth feature values related to the second image. The generating of the first comparison results may include generating second comparison results by comparing the third feature values of second variable regions of the first image with the fourth feature values of second variable regions of the second image.

In one embodiment, the first feature values may be luminance values of the first image, and the second feature values may be luminance values of the second image.

In one embodiment, the third feature values may include at least one among saturation values, signal-to-noise ratio (SNR) values, and detail values of the luminance values of the first image, and the fourth feature values may include at least one among saturation information, SNR information, and detail information of the luminance values of the second image.

In one embodiment, the generating of the first comparison results may include generating comparison results by comparing a first representative value of the first feature values of the fixed regions and the first variable regions of the first image with a second representative value of the second feature values of the fixed regions and the first variable regions of the second image.

In one embodiment, the controlling of the at least one among the first parameters and the second parameters may include setting first target luminance values which are luminance values of images to be generated by the first image sensor, and second target luminance values which are luminance values of images to be generated by the second image sensor, based on the first comparison results.

In one embodiment, the first target luminance values and the second target luminance values are set to a first reference luminance value when the first target luminance values and the second target luminance values are the same, and are set to second reference luminance values when the first target luminance values and the second target luminance values are different from each other.

In one embodiment, the first parameters may include at least one of an analog gain and an exposure time of the first image sensor, and the second parameters may include at least one of an analog gain and an exposure time of the second image sensor.

In one embodiment, the calculating of the first feature values related to the first image and the second feature values related to the second image may include: generating a first corrected image by correcting the first image on the basis of characteristics information of the first image sensor, and a second corrected image by correcting the second image on the basis of characteristics information of the second image sensor; and calculating first feature values of the first corrected image and second feature values of the second corrected image.

According to another aspect of the inventive concept, a method of controlling parameters of a plurality of image sensors includes: receiving a first image and a second image, the first image being generated by a first image sensor operated on the basis of first parameters and the second image being generated by a second image sensor operated on the basis of second parameters; calculating luminance values related to the first image and luminance values related to the second image; generating comparison results by comparing luminance values of fixed regions and variable regions of the first image with luminance values of fixed regions and variable regions of the second image; and controlling at least one among the first parameters and the second parameters on the basis of the comparison results.

In one embodiment, the comparison results may be generated on the basis of the difference between a global luminance value of the first image and a global luminance value of the second image and the differences between local luminance values of the first image and local luminance values of the second image.

In one embodiment, a first reference luminance value may be set when the first parameters and the second parameters are controlled to have the same value, and a second reference luminance value may be set when the first parameters and the second parameters are controlled to have different values.

In one embodiment, when the second reference luminance value is set, the differences between the values of the first parameters and the values of the second parameters may be equal to preset differences.

In one embodiment, after the calculating of the luminance values, the method may further include generating a first corrected image by correcting the first image on the basis of characteristic information of the first image sensor; and generating a second corrected image by correcting the second image on the basis of characteristic information of the second image sensor.

In one embodiment, the generating of the comparison results may include generating first comparison results by using the luminance values of the fixed regions of the first image and the luminance values of the fixed regions of the second image; and generating second comparison results by using luminance values of first variable regions of the first image and luminance values of first variable regions of the second image, based on the first comparison results.

In one embodiment, after the generating of the second comparison results, the generating of the comparison results may further include generating third comparison results by using feature values of second variable regions of the first image and feature values of second variable regions of the second image.

BRIEF DESCRIPTION OF THE DRAWINGS

Exemplary embodiments of the inventive concept will be more clearly understood from the following detailed description taken in conjunction with the accompanying drawings in which:

FIG. 3 is a flowchart of a method of controlling parameters of a plurality of image sensors according to an embodiment of the inventive concept;

FIG. 4 is a detailed flowchart of calculating feature values related to respective images, included in the method of FIG. 3;

FIG. 7 is a flowchart of a method generating control signals, included in the method of FIG. 3;

FIG. 8 is a flowchart of a method of controlling parameters of a plurality of image sensors according to another embodiment of the inventive concept;

DETAILED DESCRIPTION OF THE EMBODIMENTS

The inventive concept now will be described more fully hereinafter with reference to the accompanying drawings, in which embodiments of the invention are shown. The inventive concept may, however, be embodied in many different forms and should not be construed as being limited to only the embodiments set forth herein. Rather, these embodiments are provided so that this disclosure will be thorough and complete, and will fully convey the scope of the invention to those skilled in the art. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
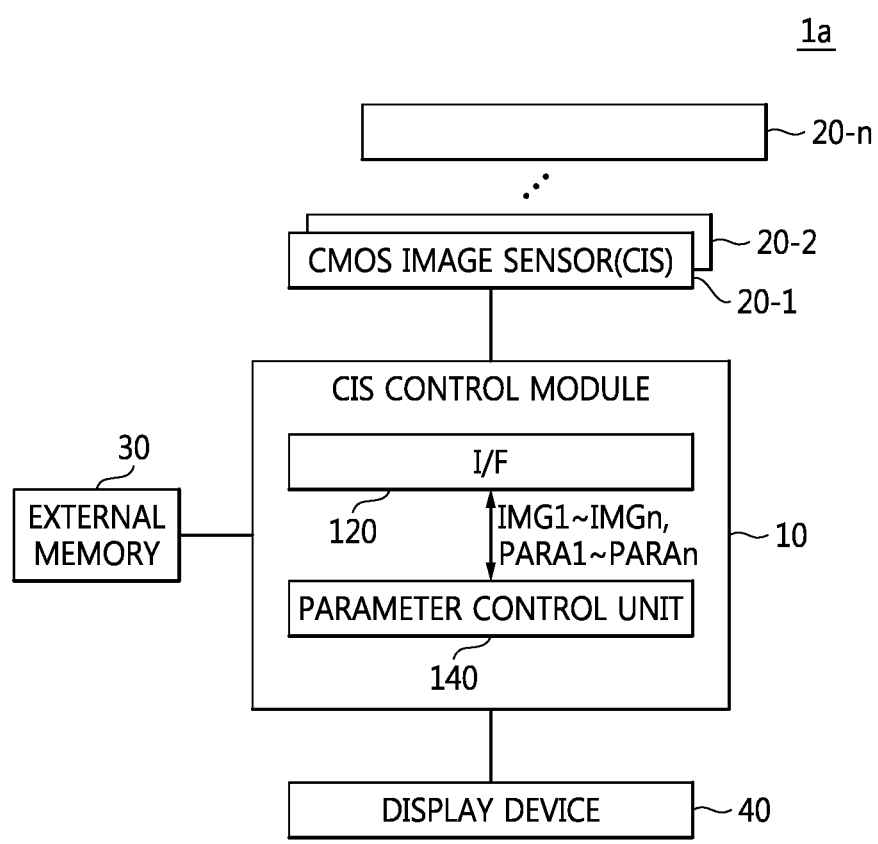
FIG. 1 is a block diagram of an image sensor control system according to an embodiment of the inventive concept.
Figure 2:
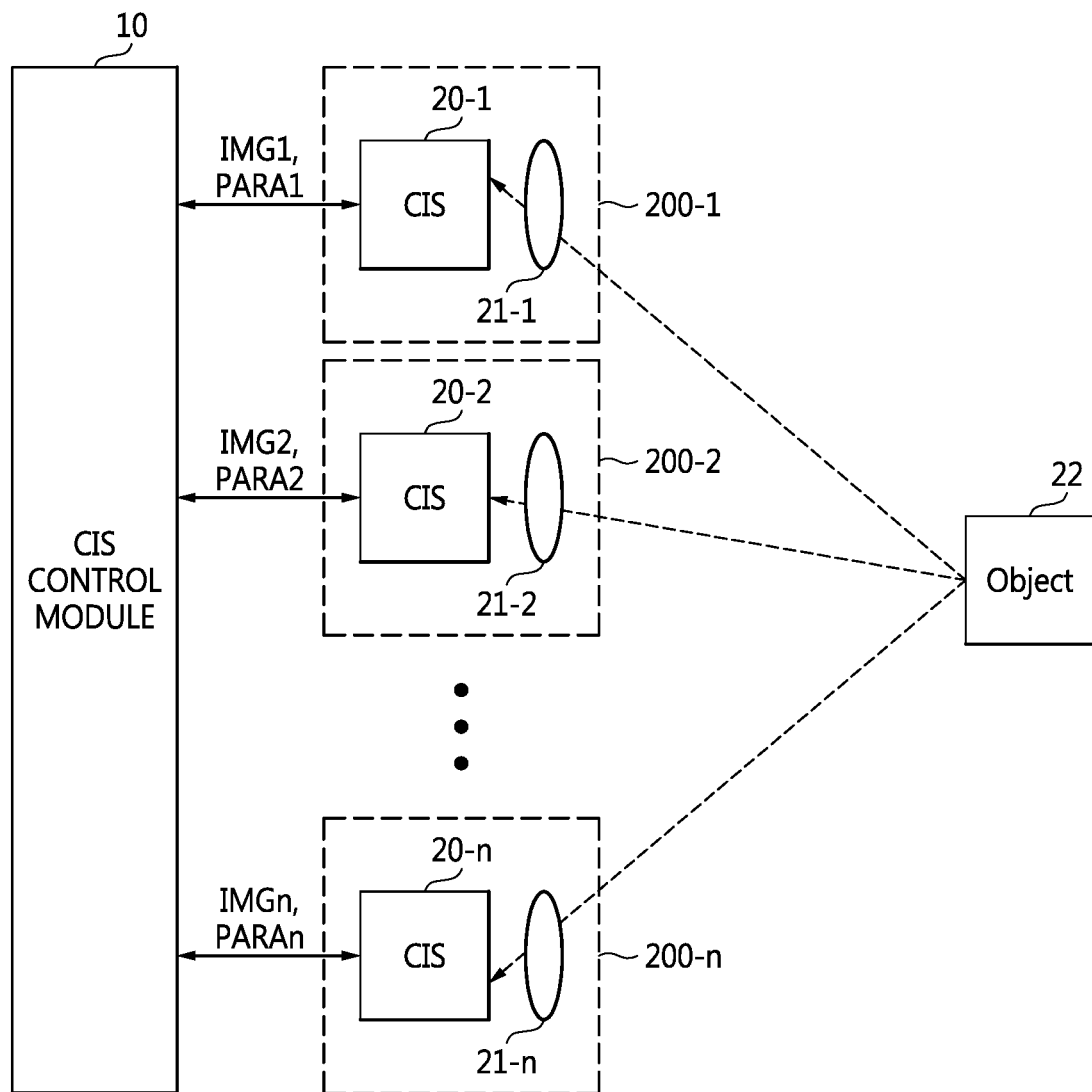
FIG. 2 is a block diagram of a CMOS image sensor (CIS) control module of FIG. 1 according to an embodiment of the inventive concept.

FIG. 1 is a block diagram illustrating an image sensor control system 1*a* according to an embodiment of the inventive concept. FIG. 2 is a block diagram further illustrating in one embodiment the CMOS image sensor (CIS) control module 10 of FIG. 1 according to an embodiment of the inventive concept.

Referring to FIGS. 1 and 2, the image sensor control system 1a may include the CIS control module 10, CISs 20-1 to 20-n, an external memory 30, and a display device 40. Here, 'n' denotes an integer greater than or equal to '2'. Thus, the number of the CISs 20-1 to 20-n will be greater than or equal to '2'.

The CISs 20-1 to 20-n may be respectively included in a plurality of camera modules 200-1 to 200-n, but embodiments of the inventive concept are not limited thereto. For example, the CISs 20-1 to 20-n may be included in camera modules, the number of which may be less than the number of CISs 20-1 to 20-n. In other words, one or more CIS(s) may be included in each one of a number of constituent camera modules.

The CISs 20-1 to 20-n may respectively convert incident light reflected from an object 22 through lenses 21-1 to 21-n into corresponding electrical signals. This conversion of incident light to corresponding electrical signals may be performed using a variety of photoelectric devices. Thereafter, the electrical signals may be converted into corresponding digital signals and respectively provided to the CIS control module 10. Each of the respective digital signals may be a stream of (e.g., sequentially arranged) digital values corresponding to pixels belonging to a pixel array (not shown) for each one of the CISs 20-1 to 20-n.

The digital signals respectively output by the CISs 20-1 to 20-n are indicated in FIG. 2 as image signals IMG1 to IMGn. Here, the image signals IMG1 to IMGn may include respective portions of imaging information obtained when the object 22 (and incorporating scene) is "imaged" (or optically viewed) from different positions within an arbitrarily defined three-dimensional (3D) reference coordinate system. In this regard, the CISs 20-1 to 20-n may be respectively controlled in their operation by corresponding parameters PARA1 to PARAn. For simplicity of description, the one or more parameters (e.g., control signal(s), control value(s), reference signal(s), reference value(s), control data, control information, etc.) controlling each CIS is indicated in FIG. 2 and will be described hereafter as a "parameter" (PARA), bearing in mind that more than one parameter may be used to variously control certain functions and operations for each one of the CISs 20-1 to 20-n. In certain embodiments of the inventive concept, the CIS control module 10, and more particularly the parameter control unit 140 of FIG. 1, may be used to define, control, adjust and/or generate the respective parameters, PARA1 to PARAn.

For example, the respective parameters PARA1 to PARAn may each include information regarding an analog gain AG and information regarding an exposure time EXPT for each CIS. The information regarding the analog gain AG (hereafter, an "analog gain parameter") may be information regarding the slope of a ramp signal used to convert an analog signal into corresponding digital data, or a difference signal between a reset signal and an image signal which are sampled using a correlated double sampling (CDS) technique by one or more of the CISs 20-1 to 20-n. The information regarding the exposure time EXPT (hereafter, an "exposure time parameter") may be information related to respective exposure conditions for one or more of the CISs 20-1 to 20-n according to certain variables associated with image exposure sensitivity (e.g., iris setting, shutter speed, etc.).

With the foregoing in mind, it should be understood that as the value(s) for the analog gain parameter and/or the exposure time parameter, as selected examples of other parameters that may be defined within various embodiments of the inventive concept, may correspond to respective image signal levels (e.g., IMG1 to IMGn), as well as the level of certain noise component(s) associated with the image signals.

The CIS control module 10 of FIG. 1 includes an interface (I/F) 120 and a parameter control unit 140.

The parameter control unit 140 may receive the plurality of image signals IMG1 to IMGn respectively generated by the plurality of CISs 20-1 to 20-n via the interface 120, and calculate "feature values" related to the image signals IMG1 to IMGn. In this regard, the parameter control unit 140 may generate comparison results related to the calculated feature values, and output control signals that control one or more of the parameters PARA1 to PARAn associated with one or more of the CISs 20-1 to 20-n on the basis of the comparison results.

Various examples of the operation of the CIS control module 10 will be described in some additional detail with reference to FIGS. 3, 4, 5A, 5B, 6A, 6B, 7, and 8 hereafter.

In FIGS. 1 and 2, the external memory 30 may be used store "characteristic information" for each of the image signals IMG1 to IMGn. In various embodiments of the inventive concept, the characteristic information may include certain predetermined values stored in the external memory 30 before operation of the CIS control module 10. In this regard, characteristic information may include spatial characteristic information and/or output characteristic information. For example, spatial characteristic information may include information related to (or defining) the geometric shape and size of the images corresponding to the image signals IMG1 to IMGn. Such characteristic information may include information related to field-of-view (FOV), focal length (FL), resolution, etc. Output characteristic information may include information related to a luminance value for one or more pixels in the images corresponding to image signals IMG1 to IMGn. Such output characteristic information may include information related to pixel pitch, sensitivity, etc.

According to an embodiment of the inventive concept, the external memory 30 may store characteristic information indicating control conditions associated with a luminance value for each of the respective image signals (or groups thereof) generated by the CISs 20-1 to 20-n.

According to an embodiment of the inventive concept, the external memory 30 may store certain characteristic information (e.g., luminance values) using one or more mapping table(s) associated with one or more of the image signals IMG1 to IMGn and/or one or more parameters PARA1 to PARAn associated with the control of the CISs 20-1 to 20-n generating the respective image signals IMG1 to IMGn.

In FIG. 1, the display device 40 may be used to variously generate and display, according to the constituent nature of the display 40, one or more visual images corresponding to one or more of the image signals IMG1 to IMGn, as generated by the CISs 20-1 to 20-n under the control of one or more of the parameters PARA1 to PARAn according to various embodiments of the inventive concept.

FIG. 3 is a flowchart summarizing in one example a method of controlling parameters that control the operation of CISs 20-1 to 20-n of FIGS. 1 and 2 according to embodiments of the inventive concept.

Referring to FIGS. 1, 2 and 3, the CIS control module 10 receives image signals (or "images") IMG1 to IMGn respectively generated by the plurality of CISs 20-1 to 20-n (operation S100).

Here, the received images IMG1 to IMGn may correspond to different views of the object 20 and may therefore have differing geometric shapes, sizes, color compositions or color reproduction, etc., according to respective positioning of the various camera modules 200-1 to 200-n within an arbitrarily expressed 3D reference coordinate system and corresponding to the specific imaging characteristics of each of the camera modules 200-1 to 200-n.

Upon receiving the plurality of images IMG1 to IMGn (S100), the CIS control module 10 may be used to calculate feature values related to the respective images IMG1 to IMGn (operation S200).

One example of a method that may be used to calculate the feature values associated with one or more of the images IMG1 to IMGn will be described in some additional detail with reference to FIG. 4.

Accordingly, FIG. 4 is a flowchart summarizing in one example the operation of calculating feature value(s) for the images IMG1 to IMGn (S200) included in the method of FIG. 3. Referring to FIG. 4, the calculation of the feature value(s) may include receiving respective characteristic information associated with each one of the CISs 20-1 to 20-n (operation S202), generating corrected images CIMG1 to CIMGn by correcting the images IMG1 to IMGn (operation S204), and calculating feature value(s) for the respective corrected images CIMG1 to CIMGn (operation S206).

Here, the respective characteristic information received for the CISs 20-1 to 20-n (S202) may include at least one of spatial characteristic information and output characteristic information related to the geometric shape(s) and/or size(s) of the images IMG1 to IMGn, as well as respective luminance value(s) for pixels corresponding to one or more of the images IMG1 to IMGn, as described above.

The generating of the corrected images CIMG1 to CIMGn (S204) may be performed according to one or more geometric transformation(s) and/or image interpolation(s) using the received characteristic information. For example, a geometric linear transformation such as rotation transformation, scaling transformation, or affine transformation may be used. The characteristic information associated with the respective images IMG1 to IMGn may include information obtained when the same scene is viewed at different positions within the 3D reference coordinate system, whereas characteristic information associated with the respective corrected images CIMG1 to CIMGn may include information obtained when the same scene is viewed at the same position within the 3D reference coordinate system. Image interpolation may include nearest neighbor interpolation, linear interpolation, high-order polynomial interpolation, spline interpolation, or adaptive linear interpolation.

In a method that controls one or more of the parameters (e.g., PARA1 to PARAn) associated with a plurality of image sensors according to certain embodiments of the inventive concept, corrected images CIMG1 to CIMGn may be used for controlling the parameters, where the corrected images are generated using characteristic information related to the images, where such characteristic information may be set before operation of the CIS control module 10. Thus, certain methods of controlling parameters for a plurality of image sensors according to embodiments of the inventive concept have the advantage of reducing time complexity during the generation of the corrected images CIMG1 to CIMGn.

The calculating of the feature values for the respective corrected images CIMG1 to CIMGn (S206) may include calculating luminance values of image pixels associated with each of the corrected images CIMG1 to CIMGn. The luminance values may be calculated on the basis of an RGB, YCbCr, CIE-Lab, or HSV color model. In certain embodiments of the inventive concept, each of the luminance values may be represented as an integer value ranging from 0 to 255, but the scope of the inventive concept is not limited to only this approach for representing the luminance values. Alternately or additionally, the feature values may include saturation values, signal-to-noise ratio (SNR) values, and detail values.

Referring back to FIGS. 1, 2 and 3, after the calculating of the feature values related to the respective images IMG1 to IMGn (S200), the CIS control module 10 may be used to generate comparison results (S300). This may be done in certain embodiments of the inventive concept by comparing (first) feature values related to fixed regions of each of the corrected images CIMG1 to CIMGn with (second) feature values related to the fixed regions of the other corrected images. Then, the CIS control module 10 may generate comparison results by comparing (third) feature values related to variable regions of each of the corrected images CIMG1 to CIMGn with (fourth) feature values related to the variable regions of the other corrected images CIMG1 to CIMGn (operation S300). In this context, the terms "first, "second", "third, and "fourth" are used in relation to FIG. 3 merely to differentiate sets of one or more features values one from the other. Here, different sets of features values may include wholly different, partially different, or the same feature values, where the constituent feature values may be variously generated. In contrast, the terms "first feature values" and "second feature values" mat be differently interrupted with respect to the method(s) described in relation to FIGS. 6A and 6B that follow.

Examples of the generating of the comparison results (S300) will be described in some additional detail with reference to FIGS. 5A, 5B, 6A, and 6B hereafter.

Figures 5A, 5B:
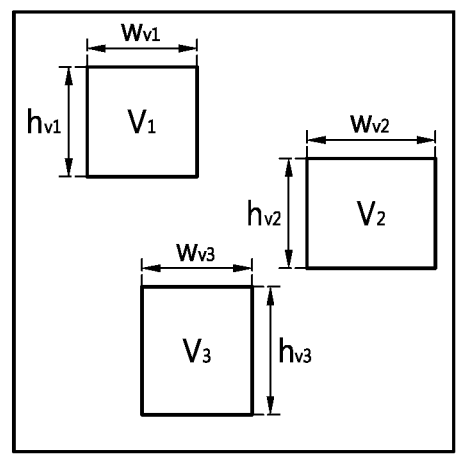
FIGS. 5A and 5B are diagrams explaining fixed regions and variable regions such as those in the method of FIG. 3.

FIG. 5A is a conceptual diagram illustrating examples of fixed regions $F_{11}$ to $F_{54}$, as an example of the type of fixed regions that may be used in the approach described above with respect to operation S330 of the method of FIG. 3.

It has previously been noted that the corrected images CIMG1 to CIMGn may have different shapes as the result of performing geometric transformation(s) on the images IMG1 to IMGn. For example, the corrected images CIMG1 to CIMGn may have a rectangular shape, a trapezoid shape, a rhombus shape, etc.

Referring to FIG. 5A, the fixed (or pre-defined) regions $F_{11}$ to $F_{54}$ may be relatively small, rectangular regions obtained by dividing, into equal parts, a maximum-sized virtual quadrangle that may exist in an overlapping region of the corrected images CIMG1 to CIMGn, assuming that the corrected images CIMG1 to CIMGn have different shapes that overlap one another. Hence, a "horizontal length" $w_f$ and a "vertical length" $h_f$ defining the fixed regions $F_{11}$ to $F_{54}$ may be the same, and therefore the number of fixed regions $F_{11}$ to $F_{54}$ included in each of the corrected images CIMG1 to CIMGn may be the same. Here, the horizontal length $w_f$ and vertical length $h_f$ may be preset values.

The fixed regions $F_{11}$ to $F_{54}$ defined with respect to the corrected images CIMG1 to CIMGn may also be defined with respect to the respective images IMG1 to IMGn. However, the fixed regions included in each of the images IMG1 to IMGn need not be rectangular in shape.

FIG. 5B is another conceptual diagram illustrating variable regions $V_{11}$ to $V_3$ as an example of the type of variable regions that may be used in the approach described above with respect to operation S330 of the method of FIG. 3.

Referring to FIG. 5B, the variable regions $V_1$ to $V_3$ may be arbitrary, relatively small, rectangular regions included in a maximum-size virtual quadrangle that may exist in an overlapping region of the corrected images CIMG1 to CIMGn as assumed above. However, the respective vertical lengths $h_{v1}$ to $h_{v3}$ and the horizontal lengths $w_{v1}$ to $w_{v3}$ for the variable regions $V_1$ to $V_3$ may be different from one another. As with the fixed regions previously described, the variable regions $V_1$ to $V_3$ illustrated in FIG. 5B are merely examples, and the total number, respective sizes, and relative positions of the variable regions $V_1$ to $V_3$ included in each of the corrected images CIMG1 to CIMGn may vary.

Variable regions, such as the variable regions $V_1$ to $V_3$ defined with respect to the corrected images CIMG1 to CIMGn, may be also defined with respect to the plurality of images IMG1 to IMGn. However, the variable regions included in each of the plurality of images IMG1 to IMGn may not have rectangular shapes.

Figure 6A:
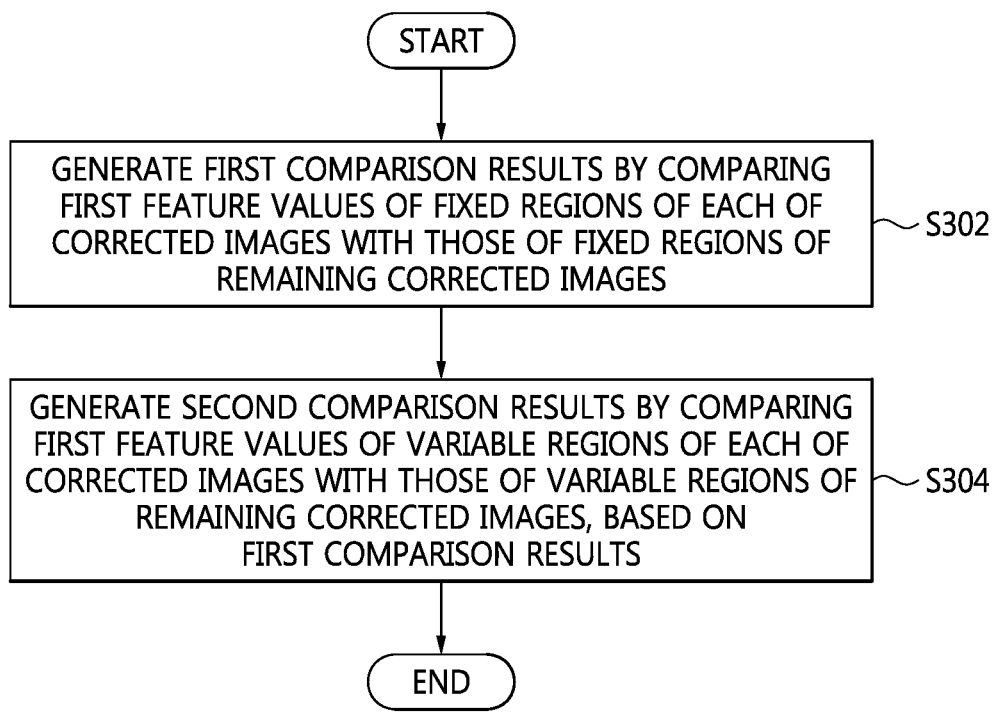
FIGS. 6A and 6B are flowcharts of a method of generating comparison results by comparing feature values of fixed regions and variable regions of each of the images with those of fixed regions and variable regions of the other images, included in the method of FIG. 3.

FIG. 6A is a flowchart summarizing in one example the generating of the comparison results (S300) in the method of FIG. 3 according to an embodiment of the inventive concept.

Referring to FIG. 6A, the generating of the comparison results (S300) may include generating first comparison results by comparing first feature values of the fixed regions of each of the corrected images CIMG1 to CIMGn with feature values of the fixed regions of the other corrected images (operation S302), and generating second comparison results by comparing the first feature values of the variable regions of each of the corrected images CIMG1 to CIMGn with feature values of the variable regions of the other corrected images in view of the first comparison results (operation S304).

In one embodiment, the first and second feature values may include luminance values for image pixels respectively associated with each of the corrected images CIMG1 to CIMGn.

According to an embodiment of the inventive concept, the generating of the first comparison results (S302) may include determining first luminance values for at least one of the respective fixed regions $F_{11}$ to $F_{54}$ with respect to the corrected images CIMG1 to CIMGn, and calculating differences between the first luminance values and luminance values determined for at least another one of the corrected images CIMG1 to CIMGn.

According to another embodiment of the inventive concept, the generating of the first comparison results (S302) may include calculating global (first) luminance values for each one of the respective corrected images CIMG1 to CIMGn, and calculating differences between the respective global (first) luminance values. In this case, the number of fixed region(s) included in each of the corrected images CIMG1 to CIMGn may be set to '1'.

According to an embodiment of the inventive concept, the generating of the second comparison results (S304) may include calculating luminance values of respective first variable regions $V_1$ to $V_3$ with respect to the corrected images CIMG1 to CIMGn and the differences between the luminance values of the corrected images CIMG1 to CIMGn, where the generating of the second comparison results includes adding the first comparison results to the differences between the luminance values.

In the generating of the first comparison results (S302) and the generating of the second comparison results (S304), the difference values may be obtained by comparing a representative value of the luminance values of the fixed regions $F_{11}$ to $F_{54}$ and a representative value of the luminance values of the variable regions $V_1$ to $V_3$ with each other. The representative values may be average values, maximum values, or intermediate values of the luminance values of the fixed regions $F_{11}$ to $F_{54}$ and the luminance values of the first variable regions $V_1$ to $V_3$.

Figure 6B:
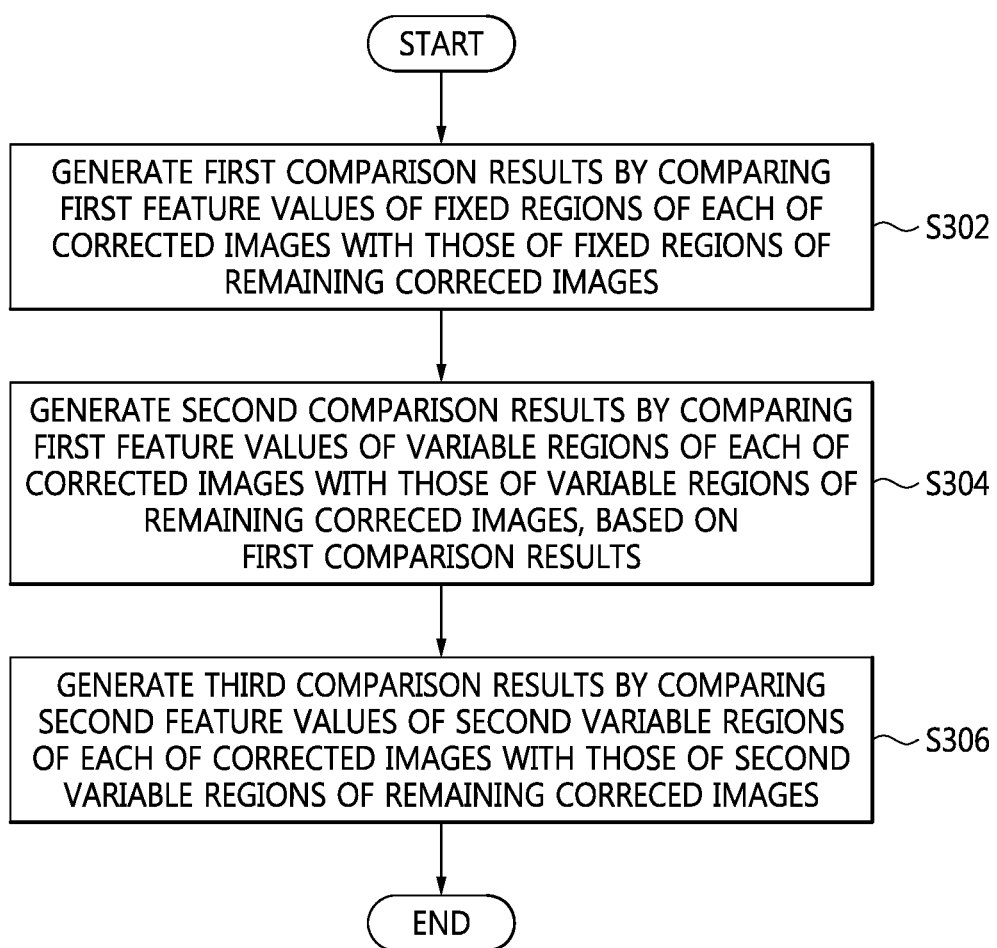

FIG. 6B is another flowchart summarizing in another example the generating of the comparison results (S300) in the method of FIG. 3 according to an embodiment of the inventive concept. The generating of the comparison results of FIG. 6B is the same as the generating of the comparison results of FIG. 6A, except for the additional generating of a third comparison results (operation S306). Thus, operations S302 and S304 of FIG. 6B are assumed to be the same as those previously described in relation to FIG. 6A.

In the generating of the third comparison results (S306), the third comparison results may be generated by comparing second feature values of second variable regions $V_1$ to $V_3$ of each of the corrected images CIMG1 to CIMGn with those of the variable regions $V_1$ to $V_3$ of the other corrected images.

In one embodiment, the second feature values may include at least one saturation value(s), SNR value(s), and detail values(s) associated with respective luminance values for image pixels (one or more pixels) for each of the corrected images CIMG1 to CIMGn.

In one embodiment, the third comparison results may be generated in a manner similar to the manner of performing the generating of the second comparison results (S304) of FIG. 6A.

However, since the second comparison results are generated based on the first comparison results, all the feature values of the fixed regions $F_{11}$ to $F_{54}$ and the first variable regions $V_1$ to $V_3$ of each of the corrected images CIMG1 to CIMGn may be considered in the generating of the second comparison results (S304). In contrast, only the second feature values of the second variable regions $V_1$ to $V_3$ of the corrected images CIMG1 to CIMGn may be considered in the generating of the third comparison results (S306).

The total number, size(s), and position(s) of the first variable regions $V_1$ to $V_3$ and the total number, size(s), and position(s) of the second variable regions $V_1$ to $V_3$ may be different from each other. Referring again to FIGS. 1, 2 and 3, after the generating of the comparison results (S300), the CIS control module 10 may be used to generate one or more control signals that control the definition of at least one of the parameters PARA1 to PARAn related to the plurality of CISs 20-1 to 20-n on the basis of the comparison results (operation S400). The generating of the control signals (operation S400). One example of his operation will be presented in some additional detail with reference to FIG. 7.

FIG. 7 is a flowchart summarizing in one example the generating of control signals (S400) described in relation to the method of FIG. 3.

Referring to FIGS. 2 and 7, the generating of the control signals (S400) may include receiving characteristic information representing (or indicating) whether images IMG1 to IMGn respectively generated by the CISs 20-1 to 20-n are to be controlled to have the same luminance value (operation S401). For example, when the plurality of CISs 20-1 to 20-n are to be controlled to generate the images IMG1 to IMGn having the same luminance value, the characteristic information may be set to '0', but when the plurality of CISs 20-1 to 20-n are to be controlled to generate the images IMG1 to IMGn having different luminance values, the characteristic information may be set to '1'.

Upon receiving of the characteristic information (S401), a determination is made as to whether the images IMG1 to IMGn to be respectively generated by the CISs 20-1 to 20-$n$ are to be controlled to have the same luminance value (operation S402). If the images IMG1 to IMGn are controlled to have the same luminance value (S402=YES), the generating of the control signals includes setting a first reference luminance value using the CIS control module 10 (operation S403). In contrast, if the images IMG1 to IMGn are controlled to have different luminance values (S402=NO), the generating of the control signals includes setting a second reference luminance value using the CIS control module 10 (operation S404).

In one embodiment, the first reference luminance value may be set based on the second comparison results. For example, a highest luminance value among luminance values based on the second comparison results may be set to the first reference luminance value.

In another embodiment, the first reference luminance value may be set based on the second comparison results and the third comparison results. For example, the highest luminance value among the luminance values based on the second comparison results may not be set to the first reference luminance value according to the third comparison results.

Referring again to FIGS. 2 and 7, upon either setting of the first reference luminance value (S403) or setting of the second reference luminance value (S404), the generating of the control signals may include setting target luminance values for the images to be generated by the respective CISs 20-1 to 20-$n$ (operation S405).

When the images IMG1 to IMGn to be respectively generated by the CISs 20-1 to 20-$n$ are controlled to have the same luminance value (S402=YES), the CIS control module 10 may set the target luminance values of the plurality of respective CISs 20-1 to 20-$n$ to the first reference luminance value.

According to one embodiment of the inventive concept, when the images IMG1 to IMGn to be respectively generated by the CISs 20-1 to 20-$n$ are controlled to have different luminance values (S402=NO), the CIS control module 10 may set the target luminance value of one image sensor 20-$k$ among the plurality of CISs 20-1 to 20-$n$ to the second reference luminance value, where 'k' is an integer greater than or equal to '1'.

Then, the target luminance values of the remaining image sensors 20-1 to 20-($k$−1) and 20-($k$+1) to 20-$n$ except for the image sensor 20-$k$ are set such that the differences therebetween are equal to a preset luminance difference, based on the second reference luminance value.

According to another embodiment of the inventive concept, when the images IMG1 to IMGn to be respectively generated by the plurality of CISs 20-1 to 20-$n$ are controlled to have different luminance values (S402=NO), the CIS control module 10 may divide the plurality of CISs 20-1 to 20-$n$ into at least two groups. The at least two groups may be divided based on the third comparison results.

For convenience of explanation, it is assumed that the plurality of CISs 20-1 to 20-$n$ are divided into a first group and a second group. In this case, the CIS control module 10 may set the target luminance values of the plurality of CISs 20-1 to 20-$m$ belonging to the first group such that the differences therebetween are equal to a preset luminance difference, based on a third reference luminance value, where 'm' is an integer ranging from 1 to n. The CIS control module 10 may set the target luminance values of the plurality of image sensors 20-($m$+1) to 20-$n$ belonging to the second group such that the differences therebetween are equal to a preset luminance difference, based on a fourth reference luminance value.

Referring to FIG. 7, after the setting of the target luminance values of the respective CISs 20-1 to 20-$n$ (S405), the generating of the control signals may include receiving mapping data from the CIS control module 10 (operation S406).

The mapping data may include data defining one or more relationship(s) between the luminance values of the images IMG1 to IMGn generated by the plurality of CISs 20-1 to 20-$n$ and the parameters PARA1 to PARAn respectively controlling the plurality of CISs 20-1 to 20-$n$.

The luminance values may be relative values. For example, the luminance values may be expressed as ratios between the luminance values of the images IMG1 to IMGn generated by the plurality of CISs 20-1 to 20-$n$ before the plurality of CISs 20-1 to 20-$n$ are respectively controlled using the parameters PARA1 to PARAn and the luminance values of the images IMG1 to IMGn generated by the plurality of CISs 20-1 to 20-$n$ after the plurality of CISs 20-1 to 20-$n$ are respectively controlled using the parameters PARA1 to PARAn.

Upon receiving of the mapping data (S406), the generating of the control signals may include generating the parameters PARA1 to PARAn of the plurality of respective CISs 20-1 to 20-$n$ by the CIS control module 10 (operation S407).

The parameters PARA1 to PARAn may be generated based on the target luminance values and the mapping data.

The parameters PARA1 to PARAn may each include information regarding an analog gain AG and information regarding an exposure time EXPT. Thus, in the method of controlling the parameters PARA1 to PARAn of the plurality of respective CISs 20-1 to 20-$n$ according to an embodiment of the inventive concept, the parameters PARA1 to PARAn of the plurality of respective CISs 20-1 to 20-$n$ may be individually controlled using feature values related to the images IMG1 to IMGn generated by the plurality of CISs 20-1 to 20-$n$.

FIG. 8 is a flowchart summarizing in one example a method of controlling parameters for a plurality of image sensors according to an embodiment of the inventive concept. The method of FIG. 8 will now be described focusing on the differences from the method of controlling parameters of a plurality of image sensors, previously described with reference to FIGS. 3, 4, 5A, 5B, 6A, 6B, and 7.

Referring to FIGS. 1, 2, and 8, the CIS control module 10 may receive an image IMGj (i.e., a single image signal) generated by a corresponding CIS 20-$j$ among the plurality of CISs 20-1 to 20-$n$ (operation S100-1), where T is an integer ranging from 1 to n.

The CIS control module 10 need not receive images IMG1 to IMG($j$−1) and IMG($j$+1) to IMGn from the other image sensors 20-1 to 20-($j$−1) and 20-($j$+1) to 20-$n$. This is a distinction when compared with operation S100 of FIG. 3. And in this context, the designated CIS 20-$j$ may be considered a master image sensor providing a "master image signal" (or "master image"), and the remaining CISs, 20-1 to 20-($j$−1) and 20-($j$+1) to 20-$n$ may be considered slave image sensors providing one or more "slave image signals" (or "slave signals").

Thus, upon receiving of the image IMGi generated by the CIS 20-$j$ (S100-1), the CIS control module 10 may calculate feature values related to the image IMGj (operation S200-1).

Unlike the operations S200, S202, S204, and S206 previously described in relation to FIGS. 3 and 4, only feature values related to the received image IMGj are calculated. That is, feature values related to the images IMG1 to IMG(j−1) and IMG(j+1) to IMGn are not calculated.

Here, the feature values may be calculated with respect to fixed regions $F_{11}$ to $F_{54}$ and variable regions $V_1$ to $V_3$ of the image IMGj, and the feature values may be luminance values.

Referring to FIGS. 1, 2, and 8, following the calculating of the feature values related to the image IMGj (S200-1), the CIS control module 10 may generate control signals for controlling at least one parameter among the parameters PARA1 to PARAn associated with the respective CISs 20-1 to 20-n (operation S400-1).

The generating of the control signals (400-1) may be performed using operations S400 and S401 to S407, as previously described in relation to FIGS. 3 and 7. In this case, a first reference luminance value may be set based on the feature values. In one embodiment, a second reference luminance value may be the same as the first reference luminance value.

Only the image IMGj generated by the CIS 20-j may be received in the method of controlling parameters of a plurality of image sensors according to another embodiment of the inventive concept illustrated in FIG. 8, unlike in the method of controlling parameters of a plurality of image sensors illustrated in FIG. 3.

The control signals for controlling at least one among the parameters PARA1 to PARAn related to the plurality of respective CISs 20-1 to 20-n may be generated using the received image IMGj. Thus, time complexity of the method of FIG. 8 is less than that of the method of controlling parameters of a plurality of image sensors illustrated in FIG. 3. In this case, the method of controlling parameters of a plurality of image sensors, illustrated in FIG. 8, may be performed in real time.

Figure 9:
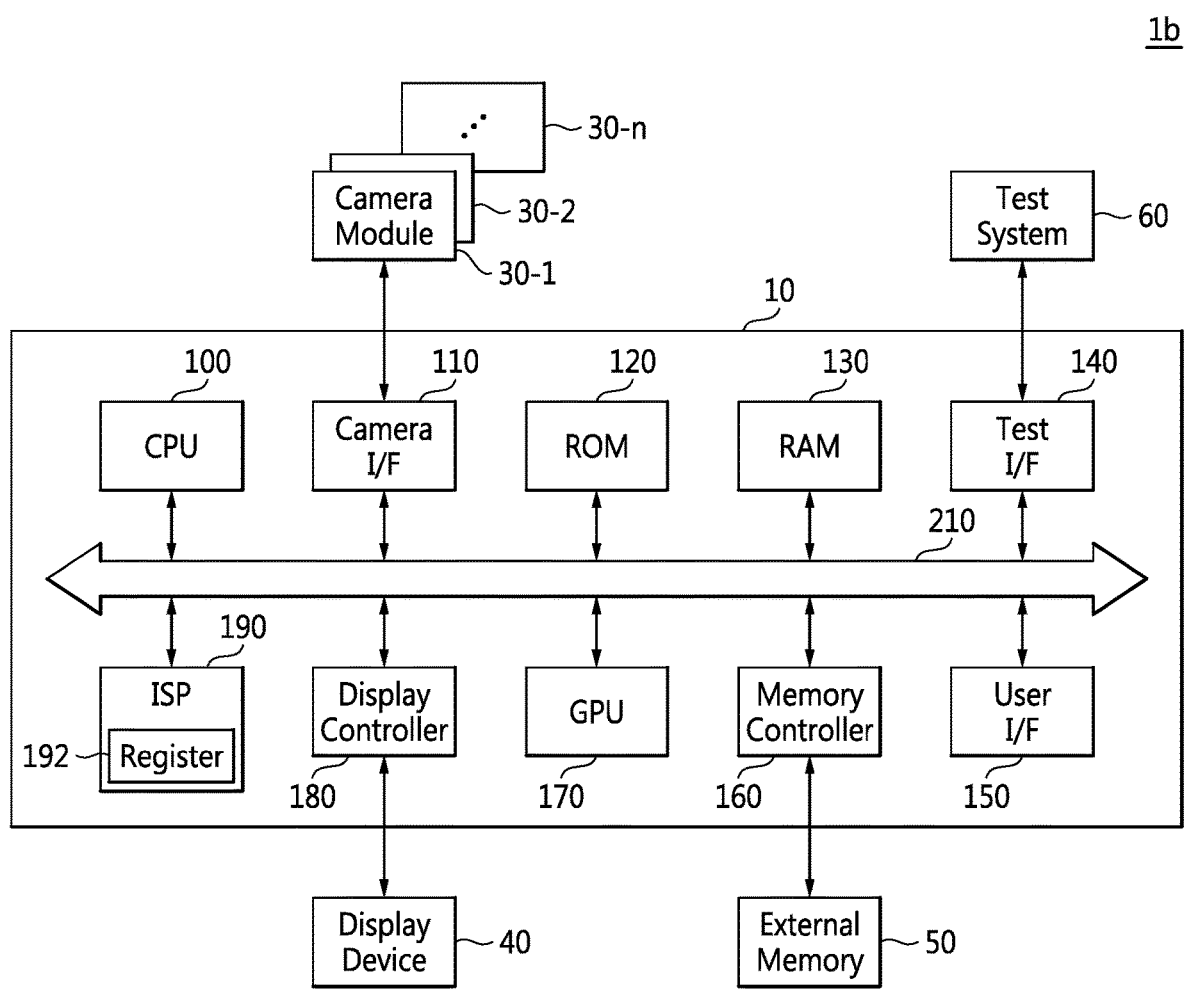
FIG. 9 is a block diagram of a camera module control system according to an embodiment of the inventive concept.

FIG. 9 is a block diagram illustrating a camera module control system 1b according to an embodiment of the inventive concept.

Referring to FIG. 9, the camera module control system 1b may be embodied as a portable electronic apparatus. The portable electronic apparatus may be a laptop computer, a mobile phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an internet-of-things (IoT) device, or an internet-of-everything (IoE) device.

The camera module control system 1b may include a system-on-chip (SoC) 10, camera modules 31-1 to 30-n, an external memory 50, and a display device 40, where 'n' is an integer greater than or equal to '2'.

The camera modules 30-1 to 30-n, the external memory 50, and the display device 40 are as described above with reference to FIG. 1. Thus, the camera module control system 1b will be described focusing on the differences from the image sensor control system 1a of FIG. 1 to avoid redundant description.

The camera module control system 1b may display, on the display device 40, still image signals (or still images) or video signals (or videos) captured by the camera modules 30-1 to 30-n.

The external memory 50 stores program instructions to be executed in the SoC 10. Also, the external memory 50 may store image data for displaying still images or a moving image on the display device 40. The moving image may include a series of different still images presented for a short time.

The external memory 50 may be a volatile memory or a nonvolatile memory. The volatile memory may be a dynamic random access memory (DRAM), a static random access memory (SRAM), a thyristor RAM (T-RAM), a zero capacitor RAM (Z-RAM), or a twin-transistor RAM (TTRAM). The nonvolatile memory may be an electrically erasable programmable read-only memory (EEPROM), a flash memory, a magnetic RAM (MRAM), a phase-change RAM (PRAM), or a resistive memory.

The SoC 10 may perform an operation corresponding to the image sensor control system 1a. The SoC 10 controls the camera modules 30-1 to 30-n, the external memory 50, and the display device 40. In one embodiment, the SoC 10 may be referred to as an integrated circuit (IC), a processor, an application processor, a multimedia processor, or an integrated multimedia processor.

The SoC 10 may include a central processing unit (CPU) 100, a read-only memory (ROM) 120, a random access memory (RAM) 130, an image signal processor (ISP) 190, a display controller 180, a graphics processing unit (GPU) 170, a memory controller 160, a camera interface 110, and a system bus 210. The SoC 10 may further include other elements in addition to the elements illustrated in FIG. 9.

The parameter control unit 140 as described above with reference to FIG. 1 may be dispersed in at least one of elements (e.g., the CPU 100, the ISP 190, etc.) included in the SoC 10 of FIG. 9.

The CPU 100 which may be also referred to as a processor may process and/or execute programs and/or data stored in the external memory 50. For example, the CPU 100 may process or execute the programs and/or data in response to an operation clock signal output from a clock signal module (not shown).

The CPU 100 may be embodied as a multi-core processor. The multi-core processor may be one computing component having two or more independent actual processors (which are referred to as 'cores'). Each of the two or more independent actual processors may read and execute program instructions.

The CPU 100 executes an operating system (OS). The OS may manage resources (e.g., a memory, a display, etc.) of the camera module control system 1b. The OS may distribute the resources to applications executed in the camera module control system 1b.

Programs and/or data stored in the ROM 120, the RAM 130, and/or the external memory 50 may be loaded to a memory (not shown) of the CPU 100 if necessary.

The ROM 120 may store permanent programs and/or data.

The ROM 120 may be embodied as an erasable programmable read-only memory (EPROM) or an electrically erasable programmable read-only memory (EEPROM).

The RAM 130 may temporarily store programs, data, or instructions. For example, the programs and/or data stored in the memory 50 may be temporarily stored in the RAM 130 under control of the CPU 100 or according to a booting code stored in the ROM 120. The RAM 130 may be embodied as a dynamic RAM (DRAM) or a static RAM (SRAM).

The ISP 190 may perform various processings on an image signal.

The ISP 190 may process image data received from image sensors (e.g., the CISs 20-1 to 20-n of FIG. 1). For example, the ISP 190 may analyze the image data received from the image sensors (e.g., the CISs 20-1 to 20-n of FIG. 1) and determine whether the image data is in focus. Also, the ISP 190 may perform image stabilization, white balancing, color correction (e.g., brightness/contrast control, etc.), color balancing, quantization, color transformation into a different color space, etc. on the image data received from the image sensors (e.g., the CISs 20-1 to 20-n of FIG. 1). The ISP 190 may periodically store image-processed image data in the memory 50 via the system bus 210.

The GPU 170 may read and execute program instructions related to graphic processing. For example, the GPU 170 may perform graphics-related graphic processing at a high speed.

Also, the GPU 170 may transform data, which is read from the external memory 50 by the memory controller 160, into a signal to be displayed on the display device 40.

For graphic processing, a graphics engine (not shown), a graphics accelerator (not shown), or the like may be used in addition to the GPU 150.

The camera interface 110 interfaces with the camera modules 30-1 to 30-n. For example, the camera interface 110 may output a control signal for controlling the camera modules 30-1 to 30-n according to a predetermined interface standard or protocol, and receive image data from the camera modules 30-1 to 30-n. The camera interface 110 may store the image data received from the camera modules 30-1 to 30-n in the external memory 50 or transmit the image data to another element, e.g., the ISP 190.

The memory controller 160 interfaces with the external memory 50. The memory controller 160 controls overall operations of the external memory 50, and exchange of data between a host (not shown) and the external memory 50. For example, the memory controller 160 may write data to the external memory 50 or read data from the external memory 50 according to a request from the host. Here, the host may be a master device similar to the CPU 100, the ISP 190, the GPU 170, the display controller 180, or the camera interface 110.

In one embodiment, the memory controller 160 may read image data from the external memory 50 and provide the image data to the memory controller 160 according to an image data request from the display controller 180.

The display controller 180 controls an operation of the display device 40.

The display controller 180 receives image data, which is to be displayed on the display device 40, via the system bus 210, converts the image data into a signal (e.g., a signal according to an interface standard) to be transmitted to the display device 40, and transmits the signal to the display device 40.

The elements 100, 110, 120, 130, 140, 150, 160, 170, 180, and 190 may communicate with one another via the system bus 210. That is, the system bus 210 functions as a path for exchanging data between the elements of the SoC 10 by connecting the elements with one another. Also, the system bus 210 may function as a path for transmitting control signals between the elements of the SoC 10.

In one embodiment, the system bus 210 may include a data bus (not shown) for transmitting data, an address bus (not shown) for transmitting an address signal, and a control bus (not shown) for transmitting a control signal.

In one embodiment, the system bus 210 may include a small-size bus (i.e., an interconnector) that facilitates data communication between two or more of the foregoing elements.

Figure 10:
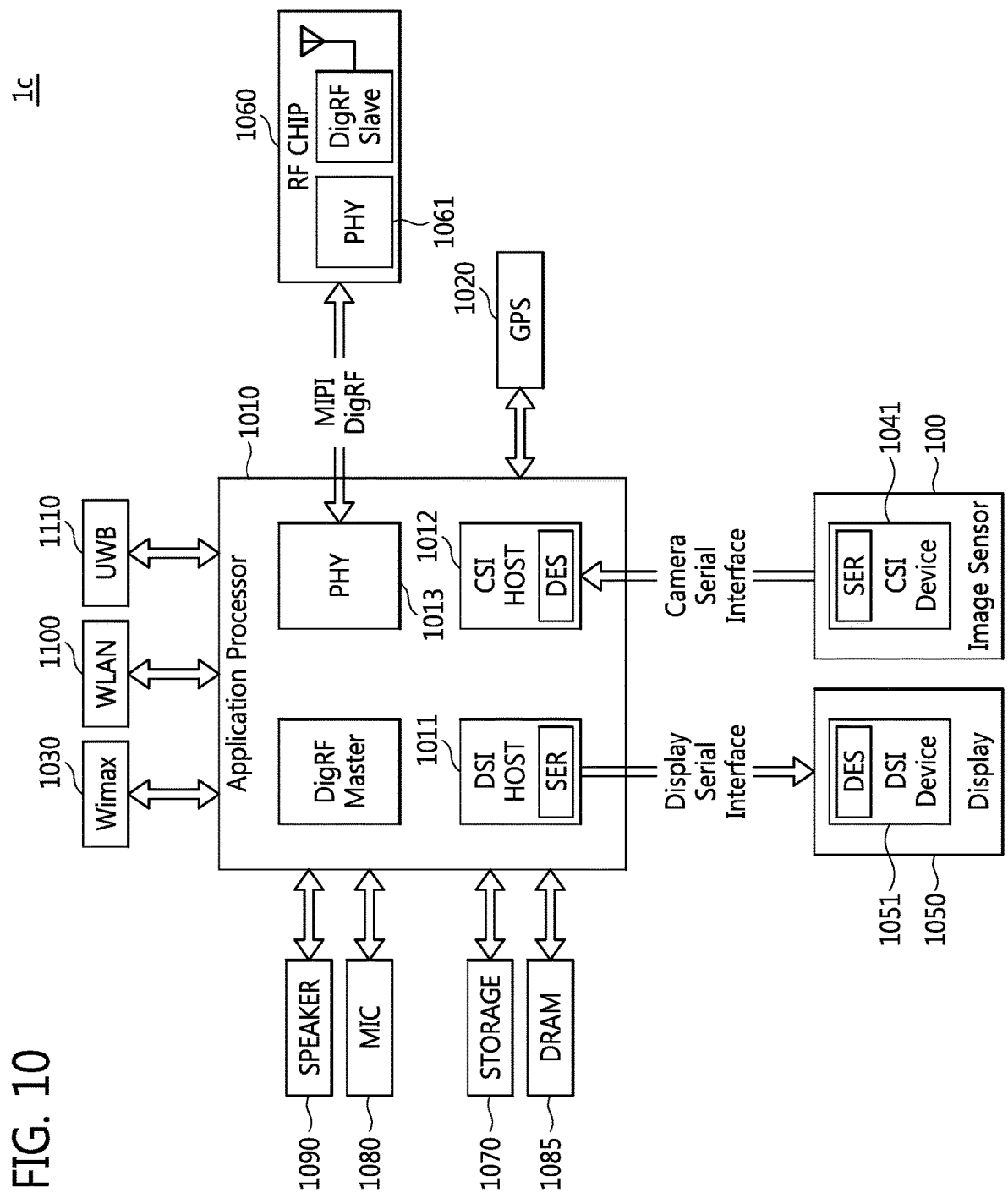
FIG. 10 is a block diagram of an electronic system according to an embodiment of the inventive concept.

FIG. 10 is a block diagram illustrating an electronic system 1c according to an embodiment of the inventive concept.

Referring to FIG. 10, the electronic system 1c may be a data processing apparatus capable of using or supporting MIPI interface, e.g., a mobile phone, a personal digital assistant (PDA), a portable multimedia player (PMP), an internet protocol television (IPTV), or a smart phone.

The electronic system 1c includes an application processor 1010, the image sensor 100, and a display unit 1050.

A camera serial interface (CSI) host 1012 included in the application processor 1010 may establish serial communication with a CSI device 1041 of the image sensor 100 through a CSI. For example, an optical deserializer may be included in the CSI host 1012, and an optical serializer may be included in the CSI device 1041.

A display serial interface (DSI) host 1011 included in the application processor 1010 may establish serial communication with a DSI device 1051 of the display 1050 through a DSI. For example, an optical serializer may be included in the DSI host 1011 and an optical deserializer may be included in the DSI device 1051.

The electronic system 1c may further include a radio-frequency (RF) chip 1060 for communicating with the application processor 1010. A physical layer PHY 1013 of the electronic system 1c and a physical layer PHY 1061 of the RF chip 1060 may exchange data with each other according to the MIPI DigRF standard.

The electronic system 1c may further include a global positioning system (GPS) 1020, a storage unit 1070, a microphone 1080, a dynamic random access memory (DRAM) 1085, and a speaker 1090. The electronic system 1c may establish communication using world-wide interoperability for microwave (Wimax) 1030, a wireless local area network (WLAN) 1100, an ultra-wide band (UWB) 1110, etc.

Certain embodiments of the inventive concept may be embodied, wholly or in part, as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

In a method of controlling parameters associated with a plurality of image sensors according to embodiments of the inventive concept, the parameters may be more efficiently controlled using characteristic information related to image signals (or images) that have been set (or stored) in a CIS control module before operation of the image sensors.

In a method of controlling parameters associated with a plurality of image sensors according to another embodiment of the inventive concept, the parameters may be controlled in various manners using luminance value(s), saturation value(s), SNR value(s), detail value(s), etc.

While the inventive concept has been particularly shown and described with reference to the exemplary embodiments illustrated in the drawings, these exemplary embodiments are merely examples. It would be obvious to those of ordinary skill in the art that these exemplary embodiments are to cover all modifications, equivalents, and alternatives falling within the scope of the inventive concept. Accordingly, the technical scope of the inventive concept should be defined based on the technical idea of the appended claims.

What is claimed is:

1. A CMOS image sensor (CIS) control module comprising:
an interface configured to:
receive a first image generated by a first camera having a first field-of-view and a first focal length, and
receive a second image generated by a second camera having a second field-of-view and a second focal length;
a controller configured to extract first feature values from the first image and second feature values from the second image, and to generate a output image different from the first and second images,
wherein the first feature values comprise first luminance values of the first image, and the second feature values comprise second luminance values of the second image, and
wherein the first field-of-view is different from the second field-of-view and the first focal length is different from the second focal length.

2. The CIS control module of claim 1, wherein the controller is a multi-core processor included in a system-on-chip.

3. The CIS control module of claim 2, wherein the controller is further configured to receive a third image generated by a third camera having a third field-of-view and a third focal length, and
wherein the third field-of-view is different from the first and second field-of-views and the third focal length is different from the first and second focal lengths.

4. The CIS control module of claim 3, wherein the first camera is a master camera and the second camera is a slave camera.

5. The CIS control module of claim 3, wherein the controller is further configured to control an exposure time of the first camera using a first exposure time parameter and control an exposure time of the second camera using a second exposure time parameter.

6. The CIS control module of claim 5, wherein the controller is further configured to control an exposure time of the third camera using a third exposure time parameter.

7. The CIS control module of claim 5, wherein the controller is further configured to generate a comparison result by comparing the first and second images and transmit a first control signal to the first camera and a second control signal to the second camera.

8. The CIS control module of claim 5, wherein the controller is configured to generate a first corrected image by correcting the first image based on the first feature values and a second corrected image by correcting the second image based on the second feature values.

9. The CIS control module of claim 8, wherein the controller is configured to generate the first corrected image by performing at least one of geometric transformation and image interpolation.

10. The CIS control module of claim 5, wherein the controller is configured to control parameters of at least one of the first camera and the second camera based on at least one of the first and second feature values.

11. The CIS control module of claim 10, wherein the parameters include at least one of an analog gain and an exposure time.

12. A CMOS image sensor (CIS) control module comprising:
an interface configured to:
receive a first image generated by a first camera having a first field-of-view and a first focal length;
receive a second image generated by a second camera having a second field-of-view and a second focal length; and
receive a third image generated by a third camera having a third field-of-view and a third focal length; and
a controller configured to:
extract first feature values from the first image and second feature values from the second image; and
generate an output image different from the first, second, and third images, and
wherein the first feature values comprise first luminance values of the first image, and the second feature values comprise second luminance values of the second image, and
wherein the first field-of-view is different from the second field-of-view and the first focal length is different from the second focal length, and
wherein the third field-of-view is different from the first and second field-of-views and the third focal length is different from the first and second focal lengths.

13. The CIS control module of claim 12, wherein the controller is a multi-core processor included in a system-on-chip.

14. The CIS control module of claim 13, wherein the controller is further configured to generate the output image based on at least one of the first feature values and the second feature values.

15. The CIS control module of claim 14, wherein the controller is configured to generate the output image by controlling the second camera based on the first feature values.

16. The CIS control module of claim 15, wherein the controller is configured to control parameters of at least one of the first camera and the second camera based on at least one of the first and second feature values.

17. The CIS control module of claim 16, wherein the parameters include at least one of an analog gain and an exposure time.

* * * * *